United States Patent [19]

Schiller et al.

[11] Patent Number: 4,585,903
[45] Date of Patent: Apr. 29, 1986

[54] CORDLESS TELEPHONE

[75] Inventors: Thomas H. Schiller, Los Altos; Aubert E. Bennett, San Bruno, both of Calif.

[73] Assignee: Viking Phone Company, Los Altos, Calif.

[21] Appl. No.: 624,390

[22] Filed: Jun. 25, 1984

Related U.S. Application Data

[63] Continuation of Ser. No. 342,066, Jan. 25, 1982, abandoned.

[51] Int. Cl.$^4$ ............................................. H04Q 7/04
[52] U.S. Cl. .................................. 179/2 EA; 455/89; 455/343
[58] Field of Search ............... 179/2 E, 2 EA, 2 EB, 179/18 DA, 90 B, 90 BD, 81 R; 455/26, 30, 58, 76, 86, 89, 127, 343, 68; 375/2.1, 2.2

[56] References Cited

U.S. PATENT DOCUMENTS

| | | | |
|---|---|---|---|
| 3,040,271 | 6/1962 | Murphy et al. | 455/127 X |
| 3,934,206 | 1/1976 | Holecek | 455/221 X |
| 3,983,484 | 9/1976 | Hodama | 455/76 |
| 4,053,717 | 10/1977 | Snider | 455/68 X |
| 4,186,344 | 1/1980 | Higuchi et al. | 455/86 |
| 4,332,981 | 6/1982 | Palombi et al. | 179/2 EA |
| 4,373,205 | 2/1983 | Mizota | 455/76 X |

Primary Examiner—W. J. Brady
Attorney, Agent, or Firm—Blakely, Sokoloff, Taylor & Zafman

[57] ABSTRACT

A cordless telephone system which provides improved performance through a number of moved circuits including the use of a single oscillator in a remote unit for providing both a standard for the transmitted signal and a local oscillator signal. The remote unit is layed out to minimize interference between the transmitted and received signal and includes a vertically disposed transmitting antenna and horizontally disposed receiving antenna.

7 Claims, 7 Drawing Figures

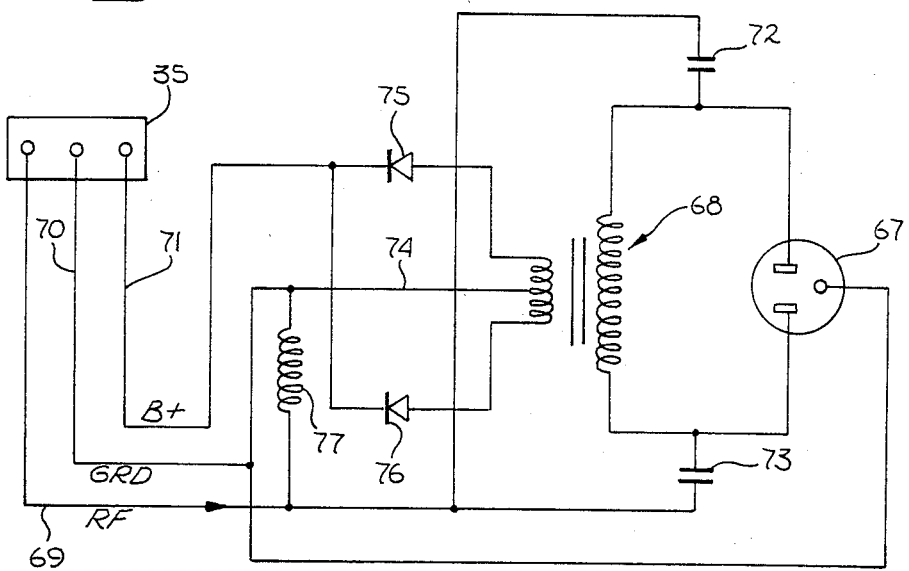
Fig. 3 POWER ADAPTOR
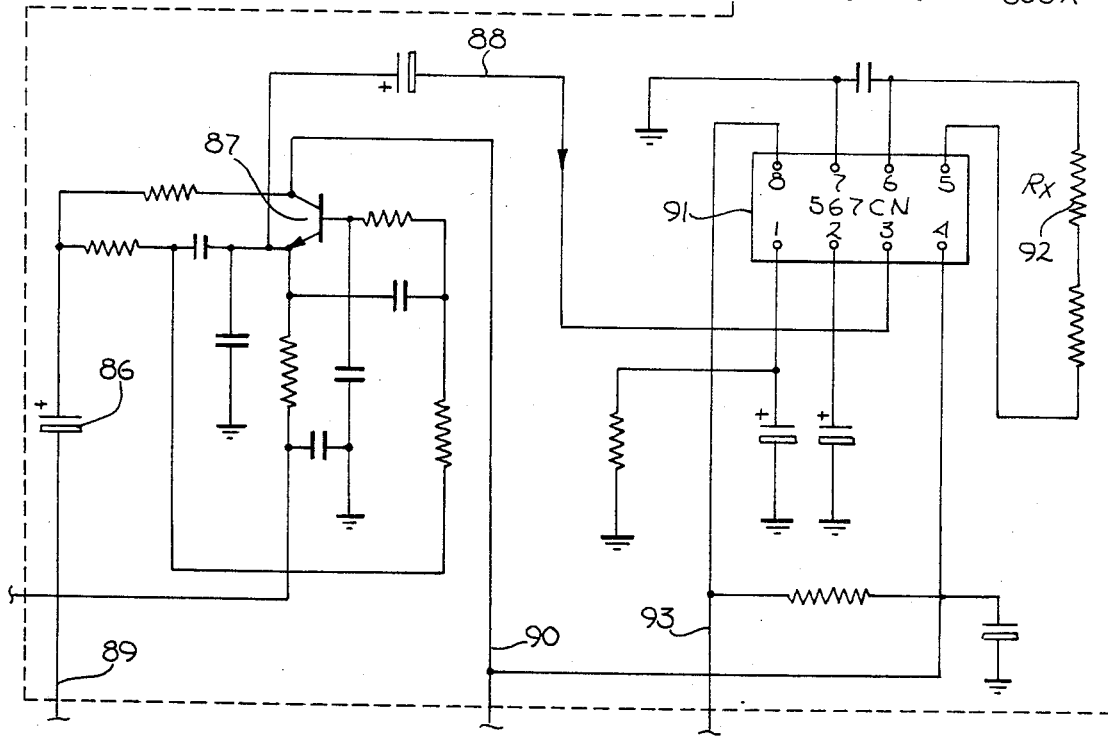
Fig. 4 FILTER & TONE DECODER
| FREQ | Rx |
|---|---|
| 100 Hz | 82 K |
| 75 Hz | 120 K |
| 55 Hz | 180 K |
| 40 Hz | 220 K |
| 30 Hz | 300 K |

CORDLESS TELEPHONE

This is a continuation of application Ser. No. 342,066 filed Jan. 25, 1982, now abandoned.

BACKGROUND OF THE INVENTION

1. Field of the Invention

The invention relates to the field of cordless telephones.

2. Prior Art

Cordless telephone systems are well-known in the prior art. They typically include a base unit which connects to a standard alternating current (AC) power outlet and a telephone line. This base unit communicates through radio transmissions with a remote unit. The remote unit is generally a hand-held member through which calls are received and placed via the base unit. Within the confines of allowable transmission power, ranges of 500 feet or so are achieved. Transmissions from the remote unit to the base unit are made at approximately 49 mHz. This Federal Communications Commission (FCC) certified link includes five frequency modulated (FM) channels each spaced-apart by 30 kHz. The base unit transmits at approximately 1.7 mHz to the remote unit. This lower frequency signal is generally coupled into the AC wiring of the house or other building, using the wiring as an antenna.

With cordless telephones, the base unit is generally open to place calls for any remote unit tuned to its same frequency. Unfortunately, this arrangement allows the placement of calls by unauthorized remote units. In some cases, a special tone has been placed on the signal transmitted by the remote unit to the base unit to prevent unauthorized calls. If the base unit detects this tone, then it is assumed that an authorized call is being placed. These tones are in the frequency range of approximately 1 kc. Expensive filtering circuitry is required in the base unit to remove this tone frequency and prevent its transmission into the telephone line.

As will be seen, the present invention provides a plurality of special tones used to prevent unauthorized calls. These tones are at, or near, the lower limit of the audio range and can be easily removed from the audio signal without the expensive filters required by the prior art units.

Prior art remote units use two oscillators, one for providing the transmission frequency and the other for the local oscillator signal which is mixed with the received signal to provide the intermediate frequency (IF). The present invention employs a single crystal controlled oscillator which is used to provide both the transmitted frequency and as a local oscillator for the mixer. The single oscillator not only reduces the cost of the system but improves performance.

Several other improvements over prior art systems are disclosed. For example, during standby modes, the remote unit reduces its standby power requirements. This increases the useful life of the batteries. The physical layout of the remote unit provides improved isolation between the received and transmitted signals.

SUMMARY OF THE INVENTION

A cordless telephone system is described which includes a base unit and a remote unit. A single crystal-controlled oscillator is used in the remote unit to provide a local oscillator signal and also to provide a transmission signal. This oscillator provides a signal of approximately 12 mHz which when mixed with the received signal provides an intermediate frequency signal of approximately 10.7 mHz. The oscillator frequency is multipled by four to provide the transmission signal of approximately 49 mHz.

The signal transmitted by the remote unit is modulated by one of four predetermined tonal frequencies, all of which are at or near the lower end of the audio range. A decoder in the base prevents access to the telephone line unless the one predetermined tone is present.

The unique physical layout of the remote unit provides improved performance. A power reduction circuit in the remote unit extends the life of the battery.

An improved power adapter is described which couples the base unit to a power outlet both for purposes of receiving power and for the transmission of a radio frequency signal through the power lines.

BRIEF DESCRIPTION OF THE DRAWINGS

FIG. 3 is an electrical schematic of the power adapter used to interconnect the base unit with a power outlet.

FIG. 4 is an electrical schematic of the filter and tone decoder used in the base unit.

DETAILED DESCRIPTION OF THE INVENTION

A cordless telephone apparatus which comprises a base unit and a remote unit is described. In the following description, numerous specific details are set forth such as specific frequencies, etc., in order to provide a thorough understanding of the present invention. However, it will be obvious to one skilled in the art that the present invention may be practiced without these specific details. In other instances, well-known circuits are shown in block diagram form in order not to obscure the present invention in unnecessary detail.

Figure 1:
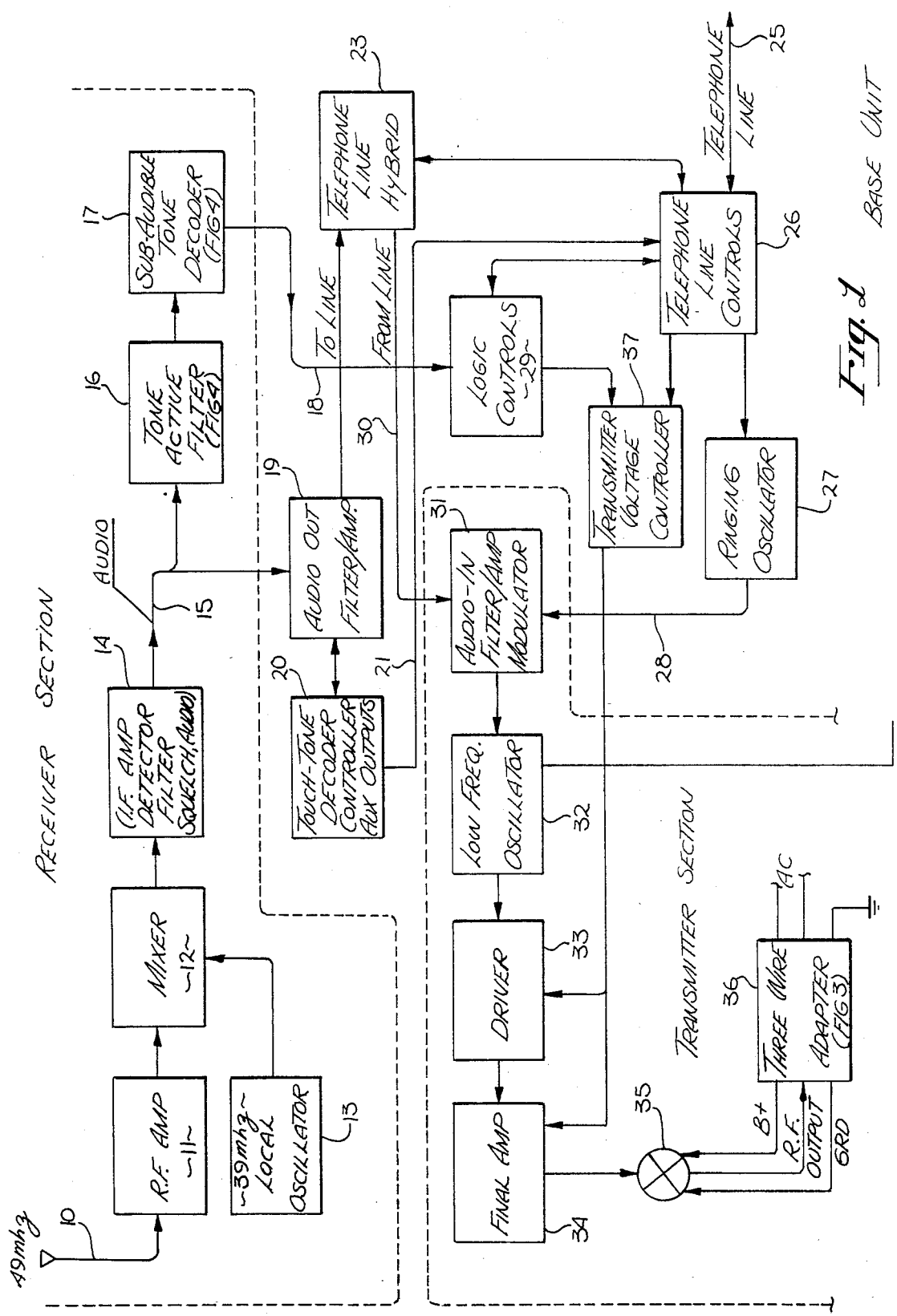
FIG. 1 is a block diagram of the base unit of the invented cordless telephone system.

First referring to FIG. 1, the block diagram of the base unit includes a receiver section, a transmitter section and a remaining section which provides control functions and coupling to the telephone line 25.

The receiver section includes an antenna 10 which receives the signal transmitted by the remote unit (one of five channels at approximately 49 mHz). The RF signal is amplified by amplifier 11 and mixed in a mixer 12 with a signal from local oscillator 13. An IF amplifier, detector and filter which includes a squelch circuit shown as block 14 is coupled to receive the output of the mixer 12. The amplifier 11, mixer 12, oscillator 13 and the circuitry shown within block 14 are ordinary well-known circuits commercially available.

The audio output from the block 14 (line 15) is coupled to an audio-out filter 19 and also to a tone filter 16. As will be described, the signal transmitted by the remote unit is encoded by frequency modulating the carrier with one of a plurality of predetermined tones which are at, or near, the lower limit of the audio range (hereinafter sometimes referred to as "subaudio tones"). The tone filter 16 and subaudio tone detector 17 detect the presence of one of the predetermined tones. The specific circuit used in the presently preferred embodiment for filter 16 and decoder 17 shall be described in detail in conjunction with FIG. 4.

If a certain one of the predetermined tones is present, a signal is communicated via line 18 to the logic control means 29. The logic control means 29 then allows coupling of the telephone line 25 through the telephone line control means 26 to permit signals from the telephone line hybrid circuit 23 to be coupled to the telephone line 25. The logic control means 29 also enables the transmitter voltage controller 37 thereby permitting power to be supplied to the transmitter section. A ringing oscillator 27 receives the ringing signal from the telephone line control means 26 and communicates the ringing signal on line 28 to the modulator 31.

The audio signal from line 15 is filtered by the filter 19. This filter is a highpass filter which passes frequencies above 120 Hz and thus removes the subaudio tones, thereby preventing this transmission into the telephone line. The output of the filter 19 is coupled to the touch-tone decoder, controller and auxillary output circuit means 20. The output of this block is coupled (as indicated by line 21) to the telephone line control means 26 for coupling to line 25. The touch-tone decoder controller converts the touch-tone sounds from the remote unit into the "dialer" signals in those cases where the telephone line 25 is not adaptable to receive touch-tone signals, that is where the Central Office operates with manual dialers. The block 20 is optional and not generally required. In most cases, the audio signal from filter 19 whether it be those generated by voice or a touch-tone dialer are coupled directly to the telephone line control means 26. The telephone line control means 26, oscillator 27, controller 37, hybrid circuit 23, touch-tone decoder controller 20 and filter 19 are ordinary circuits known in the art.

The incoming audio signal from the telephone line hybrid circuit is coupled to highpass filter and amplifier to generate the modulating signal (block 31). The output of block 31 frequency modulates the approximately 1.7 mHz RF signal generated by oscillator 32. In the presently preferred embodiment, oscillator 32 is a self-excited (non-crystal controlled) oscillator. The output of oscillator 32 is coupled to driver 33 and then into a final amplifier 34. The signal is then coupled through the connector 35 to the AC power line. The specific adapter 36 used in the presently preferred embodiment shall be described in detail in conjunction with FIG. 3.

Figure 2:
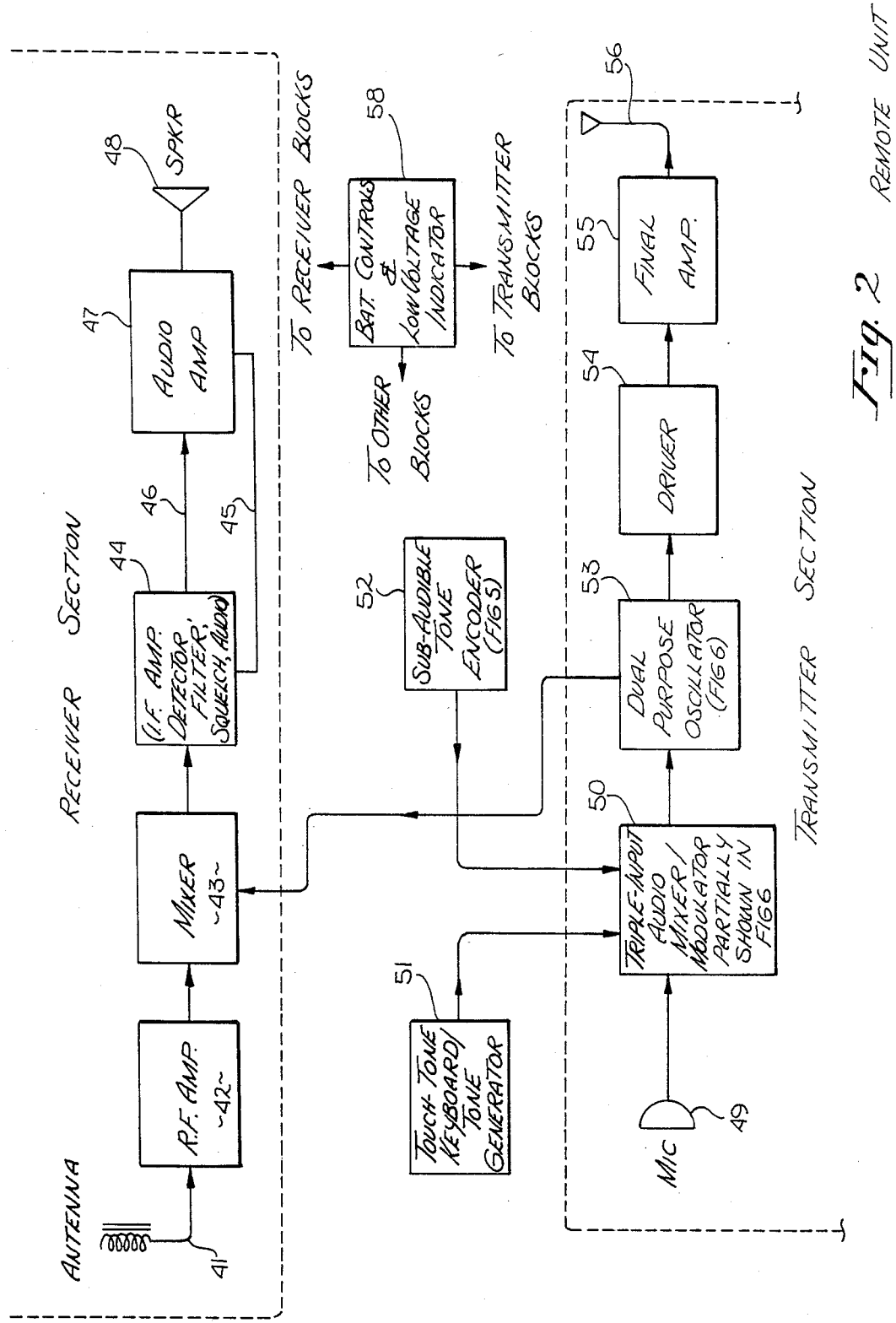
FIG. 2 is a block diagram of the remote unit of the invented cordless telephone system.

With reference to FIG. 2, a block diagram for the remote unit's receiver section is disclosed which includes an antenna 41 which receives the signal from the base unit. An RF amplifier 42 amplifies this signal and couples it to the mixer 43. An IF amplifier, FM detector and filter are used as indicated by block 44 to provide an audio signal on line 46. The circuits shown by block 44 also include a squelch circuit which provides a signal on line 45 when an RF signal is being detected. An audio amplifier 47 amplifies the audio signal on line 46, and couples it to a speaker 48. When no signal is present on line 45 a portion of the audio amplifier 47 is disconnected from its battery power supply, thereby reducing the power consumed. Obviously, when an RF signal is received, the signal on line 45 causes the entire audio amplifier 47 to be activated. The receiver section of the remote unit may be fabricated using well-known components.

As mentioned, a single oscillator 53 is used to provide a frequency reference for mixer 43 and also to provide a radio frequency reference for the signal transmitted by the remote unit to the base unit. The triple input audio mixer/modulator 50 modulates the RF signal with the audio signal from microphone 49, the audio frequency signals from the touch-tone keyboard or the subaudio tones from a tone generator shown as the subaudio encoder 52. A portion of the modulator 50 and the entire oscillator 53 are shown in detail in FIG. 6. The subaudio tone encoder 52 is shown in detail in FIG. 5.

The modulated output from the oscillator 53 is coupled through a driver 54 and an amplifier 55 to provide the RF signal at antenna 56.

The remote unit also includes a battery pack 58 and other miscellaneous controls well-known in the art.

Figure 7:
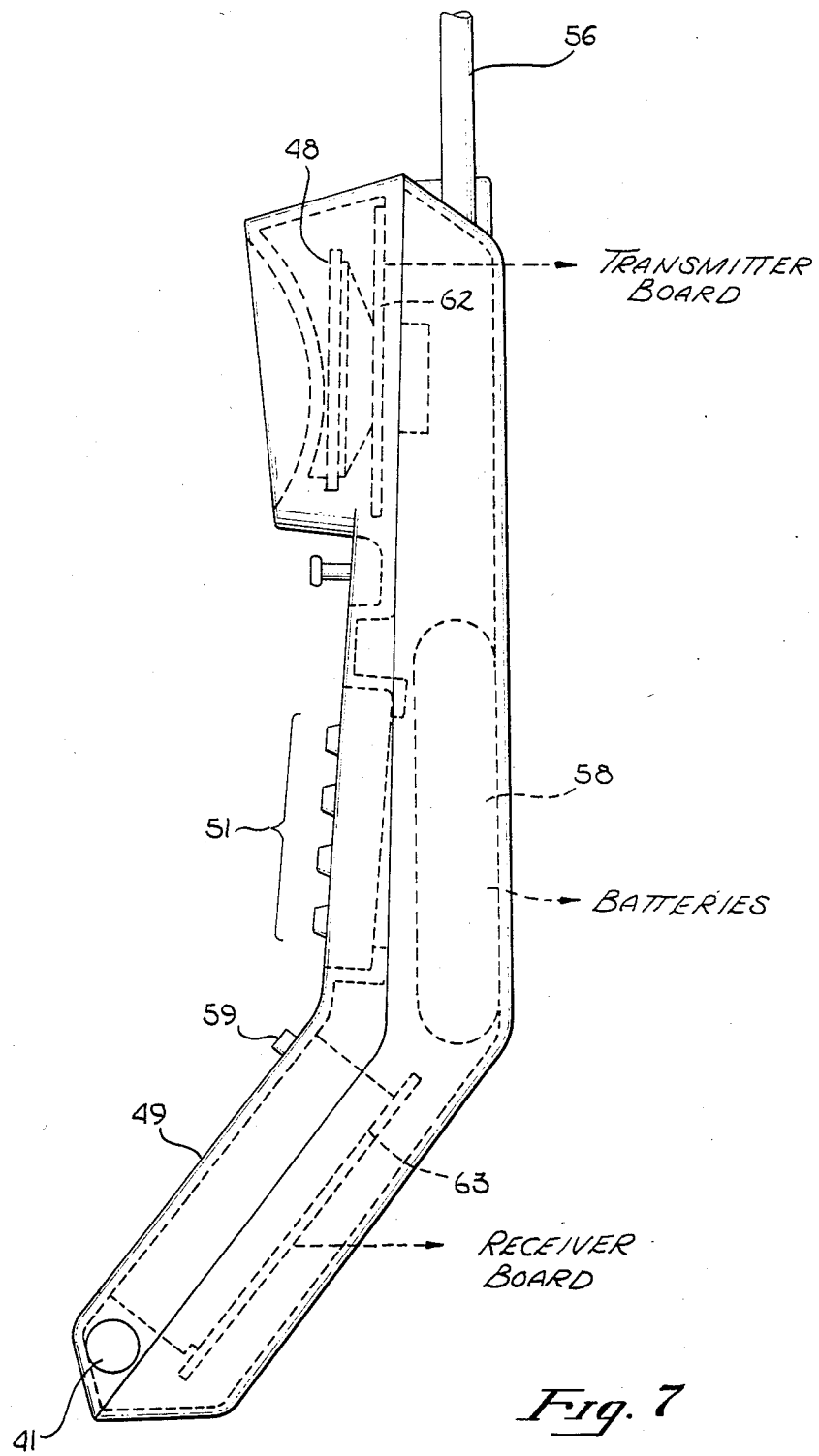
FIG. 7 is a cross-sectional side view of the remote unit.

Referring now to FIG. 7, the remote unit is a hand-holdable member having the speaker 48 at one end and a microphone 49 at the other end. One surface of the unit includes a touch tone keyboard 51 and the switch 59. Another switch is mounted on the unit although not visible in this view. One switch is an on/off switch while the other is a standby/talk switch. When this latter switch is in the "talk" position it is equivalent to having an off-hook condition.

Two circuit boards are mounted within the remote unit. One circuit board 62 includes the transmitter section such as the oscillator 53, driver 54 and final amplifier 55 of FIG. 2. The other circuit board 63 includes the RF amplifier 42, mixer 43 and the other circuitry shown in the receiver section of FIG. 2. The RF signal from the transmitter is coupled directly to the adjacent, telescoping antenna 56 while the receiver mounted on the circuit board 63 is coupled to the ferrite antenna 41. This antenna is disposed within the housing of the remote unit.

In many prior art remote units, interference occurs between the receiver and the transmitter. This causes noise problems in addition to degrading the overall performance of the system. As shown in FIG. 7, the transmitter and receiver sections are spaced-apart and are mounted as far apart as possible within the unit's housing. Also, the printed circuit boards 62 and 63 are mounted adjacent to their respective antennas, thereby eliminating long internal radio frequency paths. Additionally, antenna 56 is perpendicular to antenna 41, reducing pick-up by antenna 41 of the transmitted signal.

Referring now to FIG. 3, the illustrated adapter is used to couple the RF signals from the base unit into the power circuits and to couple power into the base unit. The connector 35 includes 3 lines, 69, 70, and 71. The RF signal is coupled to the power adapter on line 69. Line 70 is a ground line; a positive potential is coupled to the base unit on line 71. The power adapter includes a transformer 68 with its primary winding coupled to an ordinary AC power plug 67. The center tap 74 of the secondary winding is coupled to the ground line 70; line 70 is coupled to the grounding terminal of plug 67. This line is also coupled to line 69 through an inductor 77. The secondary winding is coupled through diodes 75 and 76 to line 71 to provide the positive potential on line 71. The RF line 69 is coupled to the primary windings 68 through capacitors 72 and 73.

Capacitors 72 and 73 (0.002 mfd is the presently preferred embodiment) provide substantial impedance at 60 Hz, hence, power from the primary winding is not coupled into line 69. If one of the capacitors 72 or 73 fails (shorts), the inductor 77 prevents line 69 from rising in potential since this inductor effectively provides a short circuit at 60 Hz. In the presently prefered embodiment, the inductor 77 has 33 μH of inductance.

Figure 5:
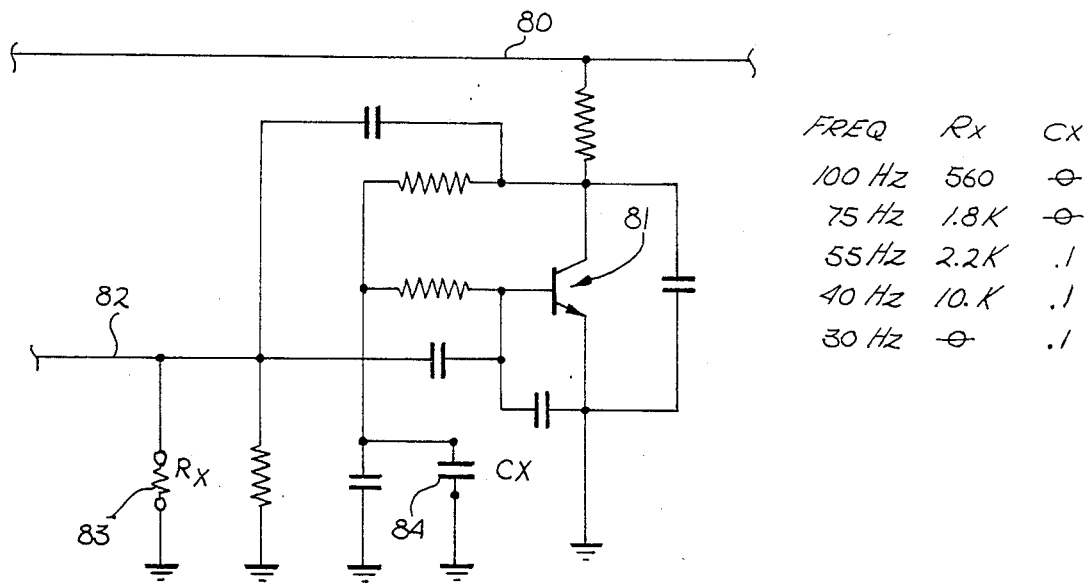
FIG. 5 is an electrical schematic of the tone encoder used in the remote unit.

As mentioned, the signal transmitted between the remote unit and base unit is modulated with a low frequency (subaudio) signal. Unless a certain frequency is present, the base unit will not, for example, allow placement of a call. The circuit which provides this low frequency tone is shown in FIG. 5. The circuit is a somewhat standard oscillator powered from line 80 and employing transistor 81. The low frequency tone is generated on line 82. The oscillator includes a resistor 83 and a capacitor 84 identified as $R_x$ and $C_x$, respectively. A table is shown to the right of the oscillator circuit with the presently preferred values for $R_x$ and $C_x$. If, for example, the particular system is to be encoded with a tone of 40 Hz, then $R_x$ is 10 k and $C_x$ is 0.1 mfd. When the system is fabricated, one of the five tones is selected for both the remote unit and base unit. Also, one of the five FCC assigned channels is selected. With the selection of one of the five channels and one of the five tones, 25 combinations are possible. Thus, in theory only every 25th remote unit and base unit will be compatible. This minimizes the possibility of unauthorized or accidental access to the base unit.

The circuit for detecting the subaudio tone is shown in FIG. 4. It includes a lowpass filter which has a cutoff frequency of approximately 120 Hz. The input audio signal (line 89) is coupled through capacitor 86 to the filter associated with the transistor 87. The low frequency signal is then coupled through line 88 to the tone decoder. Although in the presently preferred embodiment a low frequency tone is used to control access to the base unit, it will be appreciated by one skilled in the art that non-audible high frequency signals may also be used to acheive substantially the same result.

The tone decoder comprises a phase-lock loop contained within the integrated circuit 91. In the presently preferred embodiment, a commercial phase-lock loop integrated circuit (Part No. 567CN) is utilized. The frequency of this loop is determined by resistor 92 ($R_x$). As mentioned, a tone is selected to match that transmitted by the remote unit. If the frequency of the signal on line 88 matches the frequency for which the phase-lock loop has been set, a signal appears on line 93 allowing the base unit, for instance, to place a call. Power for the circuit of FIG. 4 is provided on line 90.

Figure 6:
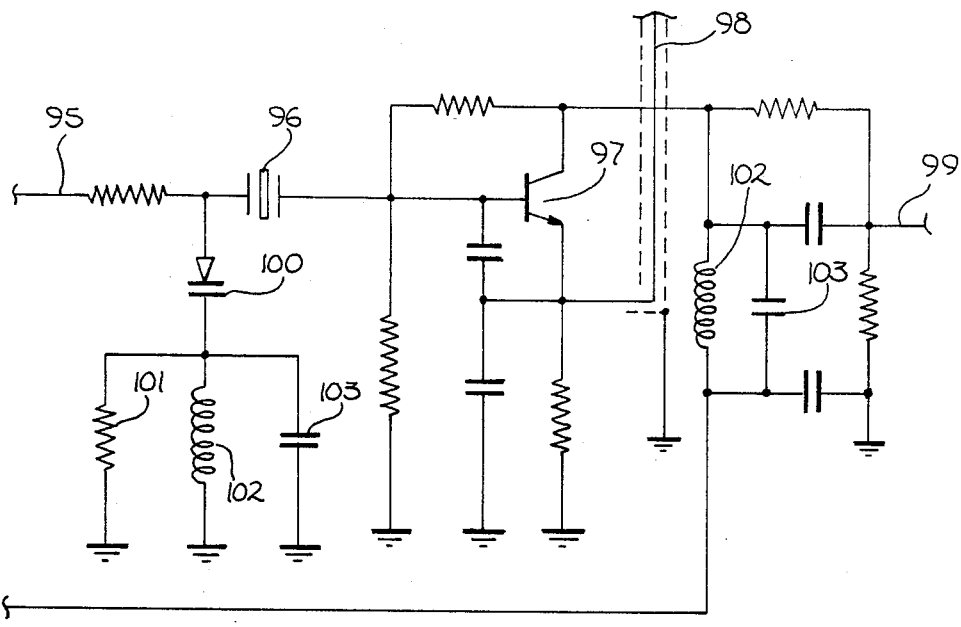
FIG. 6 is an electrical schematic of the modulator and oscillator circuits used in the remote unit.

Referring now to FIG. 6, a crystal 96 provides a frequency standard for the modulator and oscillator of FIG. 6. This crystal, in conjunction with the variable capacitor 100, resistor 101, inductor 102 and capacitor 103 provide the fundamental frequency of approximately 12.5 mHz to the base terminal of the transistor 97. (Crystals of frequency equal to 12.457 or 12.472 mHz are used.)

The audio signal on line 95 frequency modulates the signal applied to the transistor 97 because of capacitor 100. Relatively small amounts of modulation are required.

The output of the transistor 97 is coupled through line 98 to provide a local oscillator signal for the mixer 43 of FIG. 2. Note that this local oscillator signal may be modulated by the audio signal, however, after the mixing operation and the detection of the audio signal received by the antenna 41 of FIG. 2, substantially no audible signal is heard. The output from the transistor 97 is frequency multiplied by 4 to provide a signal on line 99 which after being amplified is transmitted. The inductor 102 and capacitor 103 are used to provide this multiplied signal. The effect of this multiplication is to increase the modulation, thus a larger amount of energy associated with the audio signal is transmitted.

Thus, a cordless telephone has been described which provides numerous improvements over the prior art including the use of a single oscillator in the remote unit, subaudio tone encoding to prevent unauthorized access of the base unit and an improved layout in the remote unit which reduces interference between the transmitted and received signals.

We claim:

1. In a cordless telephone system which includes a base unit and a remote unit, an improved coupler for coupling said base unit to an alternating current power outlet comprising:
   a transformer having a primary winding for coupling to said power outlet and a center tapped secondary winding;
   diodes coupled to said secondary winding for providing a direct current potential for said base unit;
   a first line for transmitting a radio frequency signal from said base unit;
   an inductor coupling said first line to the center tap of said secondary winding;
   a pair of capacitors for coupling said first line to said primary winding of said transformer;
   a second line for coupling to the grounding terminal of said power outlet, said second line being coupled to said center tap of said secondary winding,
   whereby a highly efficient power adapter is realized.

2. In a cordless telephone system which includes a base unit, an improved remote unit, comprising:
   a hand-holdable housing which encloses a receiver for receiving a signal from said base unit, a transmitter for transmitting a signal to said base unit, an oscillator for generating a predetermined frequency, said transmitter being coupled to said oscillator so that the frequency of the signal transmitted to said base unit is determined by said predetermined frequency, and a mixing means for mixing a received signal from said receiver with a signal from said oscillator to provide an intermediate frequency signal;
   a speaker placed at one end of said hand-holdable housing, said speaker being coupled to said receiver;
   a microphone placed at the other end of said hand-holdable housing, said microphone being coupled to said transmitter;
   a first antenna mounted adjacent to a first board which includes said transmitter, said first antenna being coupled to said transmitter and being mounted adjacent to said one end of said hand-holdable housing;
   a second antenna mounted adjacent to a second board which includes said receiver, said second antenna being coupled to said receiver and being mounted adjacent to said other end of said hand-holdable housing and being perpendicular to said first antenna;
   whereby the spatial separation of the receiver from the transmitter reduces interference between said receiver and said transmitter, and whereby a single oscillator is used to provide a standard for both a transmitted signal and an intermediate frequency signal.

3. The improved remote unit defined in claim 2, further comprising:
a circuit means for receiving a squelch signal and coupling it to an audio amplifier to reduce power consumed by said audio amplifier when said remote unit is not receiving or transmitting.

4. The improved remote unit defined in claim 3, wherein said first antenna is extendable and said second antenna is composed of ferrite.

5. The improved remote unit defined in claim 4 wherein:
said oscillator includes a crystal for establishing said predetermined frequency, said predetermined frequency being approximately 12.5 mHz;
said intermediate frequency is approximately 1.8 mHz; and
said frequency of the signal transmitted to said base unit is four time said predetermined frequency.

6. The cordless telephone system comprising:
(a) a base unit for connection to telephone lines, said base unit including means for transmitting and receiving telephone switching signals and audio signals to and from a remote unit; and
(b) a remote unit comprising:
a hand-holdable housing which encloses a receiver for receiving a signal from said base unit, a transmitter for transitting a signal to said base unit, an oscillator for generating a predetermined frequency, said transmitter being coupled to said oscillator so that the frequency of the signal transmitted to said base unit is determined by said predetermined frequency, and a mixing means for mixing a received signal from said receiver with a signal from said oscillator to provide an intermediate frequency signal;
a speaker placed at one end of said hand-holdable housing, said speaker being coupled to said receiver;
a microphone placed at the other end of said hand-holdable housing, said microphone being coupled to said transmitter;
a first antenna mounted adjacent to a first board which includes said transmitter, said first antenna being coupled to said transmitter and being mounted adjacent to said one end of said hand-holdable housing;
a second antenna mounted adjacent to a second board which includes said receiver, said second antenna being coupled to said receiver and being mounted adjacent to said other end of said hand-holdable housing and being perpendicular to said first antenna; and
(c) an improved apparatus for preventing unauthorized access to said base unit comprising:
a signal generation means located in said remote unit for generating a predetermined tone of frequency at, or near, the lower end of the audible frequency range;
a modulation means located in said remote unit for modulating the carrier transmitted from said remote unit to said base unit with said predetermined tone;
a filter located in said base unit for filtering out signals having a frequency above said predetermined tone;
a phase-lock loop located in said base unit for detecting said predetermined tone; and
a control means coupled to said phase-lock loop for selectively coupling said base unit to said telephone lines;
whereby the spatial separation of the receiver from the transmitter reduces interference between said receiver and said transmitter,
whereby a single oscillator is used to provide a standard for both a transmitted signal and an intermediate frequency signal, and
whereby access to said base unit is prevented unless the carrier is modulated with said predetermined tone.

7. The cordless telephone system defined in claim 6, wherein:
said predetermined tone is less than approximately 100 Hz,
said first antenna is extendable,
said second antenna is composed of ferrite,
said oscillator includes a crystal for establishing said predetermined frequency, said predetermined frequency being approximately 12.5 mHz,
said intermediate frequency is approximately 1.8 mHz,
said frequency of the signal transmitted to said base unit is four times said predetermined frequency; and further comprising:
a circuit means for receiving a squelch signal and coupling it to an audio amplifier to reduce power consumed by said audio amplifier when said remote unit is not receiving or transmitting.

* * * * *